(12) United States Patent
Yu Chen

(10) Patent No.: US 6,691,416 B2
(45) Date of Patent: Feb. 17, 2004

(54) CUTTER FOR VEHICLE SAFETY BELTS OR THE LIKE

(76) Inventor: Hsiu-Man Yu Chen, No. 27, Sec. 1, Dafu Rd., Tantz Shiang, Taichung (TW), 427

( * ) Notice: Subject to any disclaimer, the term of this patent is extended or adjusted under 35 U.S.C. 154(b) by 0 days.

(21) Appl. No.: 10/179,213

(22) Filed: Jun. 26, 2002

(65) Prior Publication Data

US 2004/0000059 A1 Jan. 1, 2004

(51) Int. Cl.[7] .............................................. B26B 29/02
(52) U.S. Cl. ........................ 30/294; 30/125; 30/329; 30/339
(58) Field of Search .................... 30/294, 125, 124, 30/DIG. 8, 329, 332, 333, 339, 337

(56) References Cited

U.S. PATENT DOCUMENTS

| | | | | |
|---|---|---|---|---|
| 4,091,537 A | * | 5/1978 | Stevenson, Jr. .............. | 30/286 |
| 4,134,206 A | * | 1/1979 | Beermann ..................... | 30/294 |
| 5,282,316 A | * | 2/1994 | Anderson ..................... | 30/294 |
| 5,737,842 A | * | 4/1998 | Freedman ..................... | 30/280 |
| 5,890,290 A | * | 4/1999 | Davis .......................... | 30/162 |
| 6,195,896 B1 | * | 3/2001 | Ireland ........................ | 30/294 |
| 6,553,674 B1 | * | 4/2003 | Budrow ....................... | 30/162 |
| 6,574,868 B1 | * | 6/2003 | Overholt ...................... | 30/329 |

* cited by examiner

Primary Examiner—Hwei-Siu Payer
(74) Attorney, Agent, or Firm—Troxell Law Office PLLC

(57) ABSTRACT

A cutter for vehicle safety belts or the like includes a body having a head in an upper portion and a handle in a lower portion. The head has a blade base surface for a cover plate to be put thereon. The blade base surface is formed relatively lower for receiving the cover plate thereon. The cover plate can be pried open for renewal of a blade. A first blade groove for placing a blade for cutting and a second blade groove for placing another blade on standby are provided parallel to each other in the head. The handle is formed with a small recess on an upper front edge and a large recess on a lower front edge and has a tapered projection positioned between the two recesses for enabling a user to stably hold the handle conveniently.

2 Claims, 3 Drawing Sheets

CUTTER FOR VEHICLE SAFETY BELTS OR THE LIKE

BACKGROUND OF THE INVENTION

This invention relates to a cutter, particularly to one used for rapid severing of vehicle safety belts, packaging straps or the like.

A conventional cutter, as disclosed in a U.S. Pat. No. 4,134,206 titled "CUTTER FOR VEHICLE SAFETY BELTS", includes a handle, a blade and a head member, mainly employed for severing of vehicle safety belts. However, such a conventional cutter has the following defects.

1. When it is used, its blade has to be pushed outward and exposed for use, possible to cut and hurt a user in case of using it in a great hurry.
2. It is provided with only one blade without any other blade reserved for use, giving rise to trouble and danger should an emergency arise and the only one blade worn off and becoming useless.
3. The blade of a conventional cutter is fixedly combined with the cutter by means of screws, inconvenient to be disassembled and renewed.
4. The handle of a conventional cutter is not ideally designed, not easy to be held stably in a great hurry.

SUMMARY OF THE INVENTION

The main objective of the invention is to offer a cutter for vehicle safety belts or the like, having its blade sandwiched between a recessed blade-base surface and a cover plate on its head and renewed only by prying open the cover plate, and having its blade-base surface provided with two blade grooves for receiving two blades, easy in operating and convenient in renewing the blade.

Another objective of the invention is to offer a cutter for vehicle safety belts or the like, having its handle formed with two arcuate recesses having a tapered projection there between, and a reinforcing projection secured around the circumferential edge of the handle, enabling a user to hold the handle stably and conveniently.

BRIEF DESCRIPTION OF DRAWINGS

This invention will be better understood by referring to the accompanying drawings, wherein.

DETAILED DESCRIPTION OF THE PERFERRED EMBODIMENT

Figure 1:
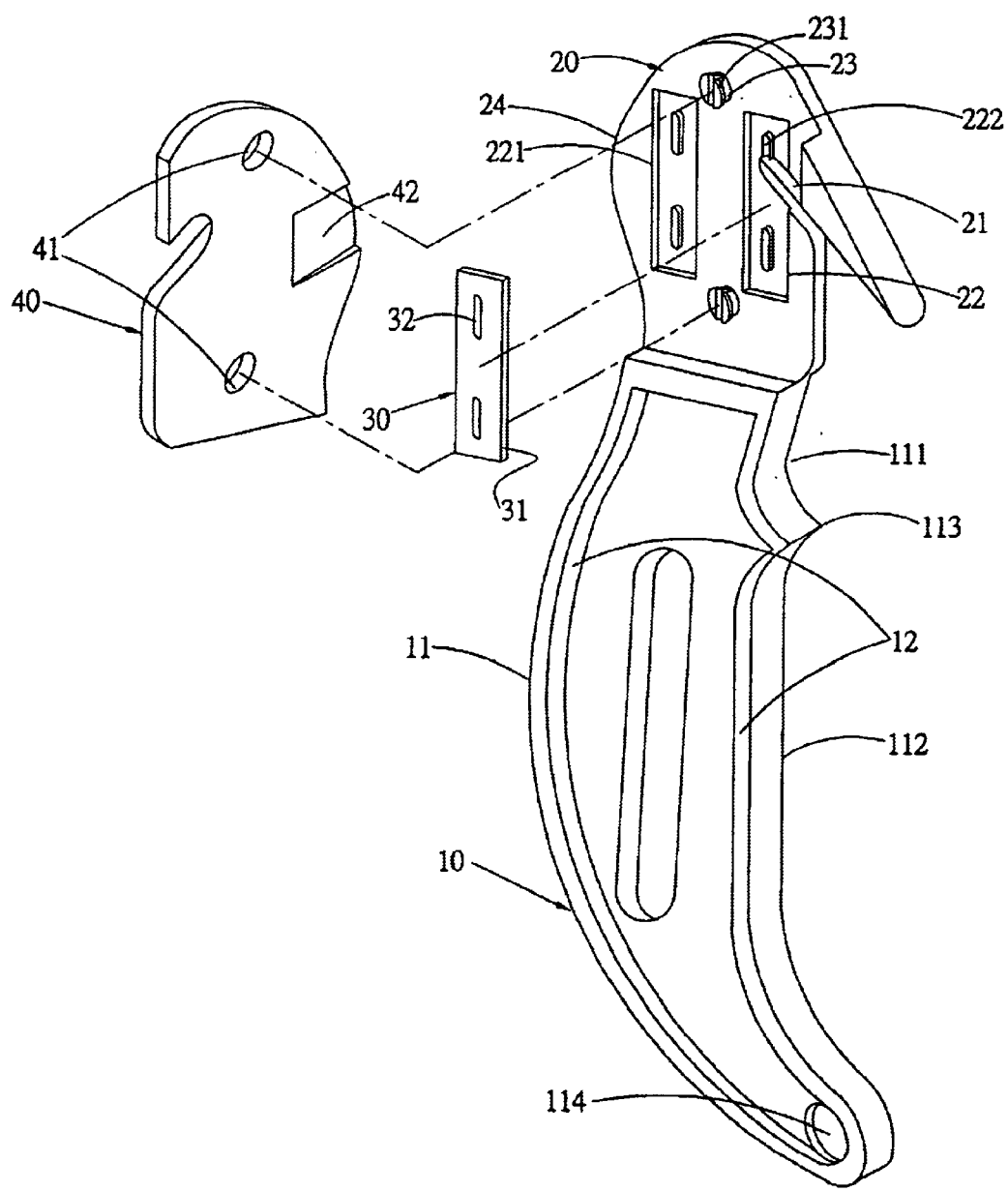
FIG. 1 is an exploded perspective view of a cutter for vehicle safety belt or the like in the present invention.
Figure 2:
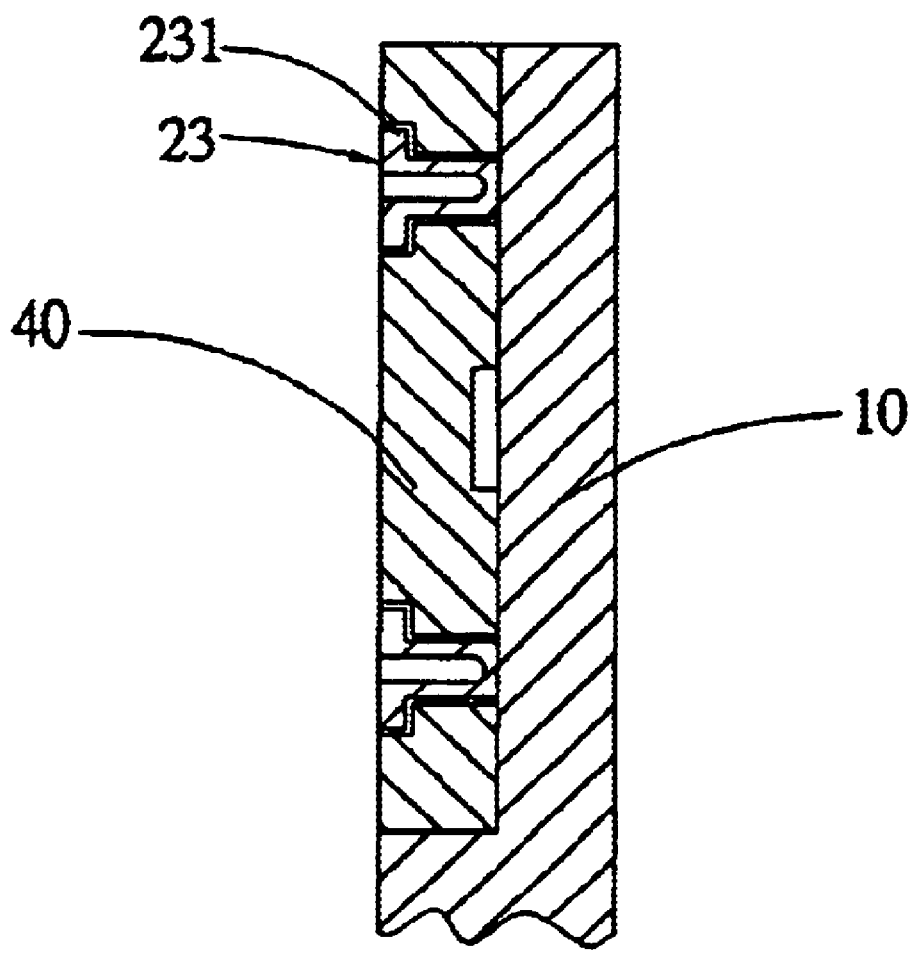
FIG. 2 is side sectional view of the combination of the combining members on the head of the cutter with the combining holes of a cover plate in the present invention.
Figure 3:
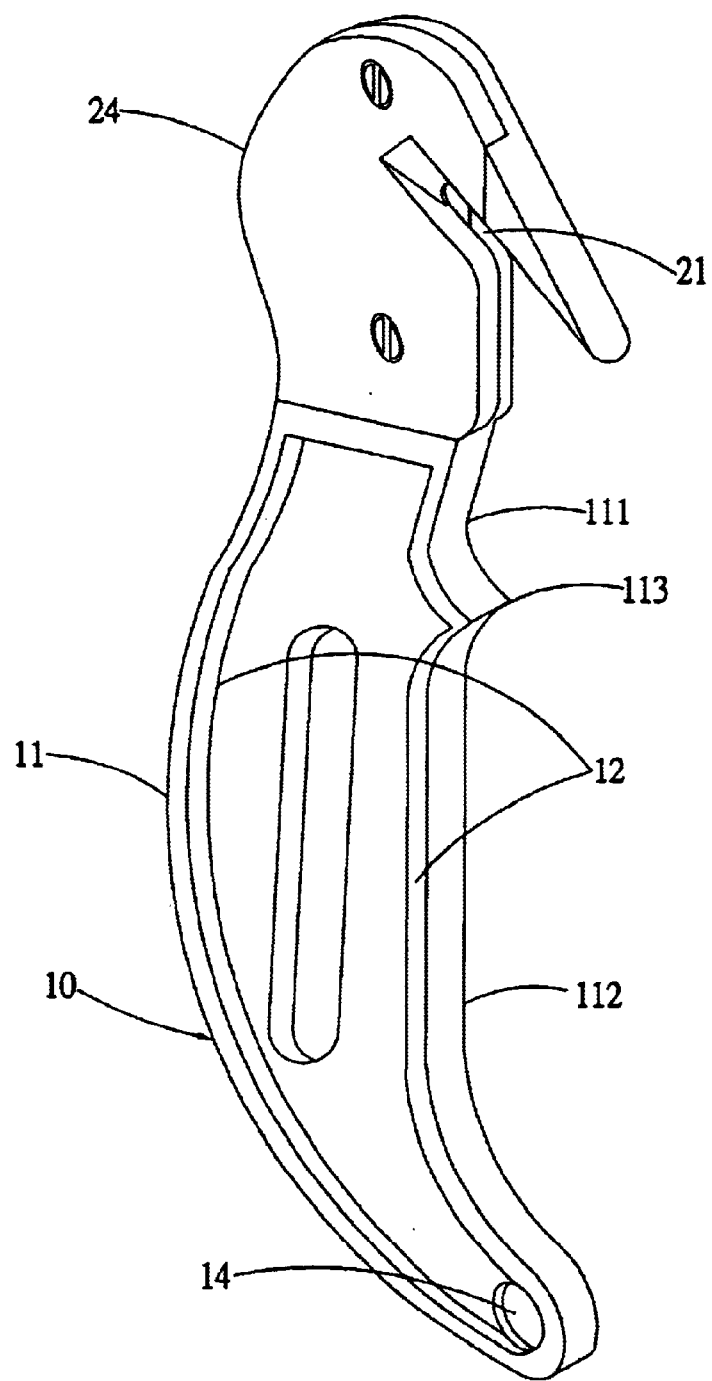
FIG. 3 is a perspective view of the cutter for vehicle safety belts or the like in the present invention.

A preferred embodiment of a cutter for vehicle safety belts or the like in the present invention, as shown in FIGS. 1 and 2, includes a body 10, two blades 30 and a cover plate 40 as main components combined together.

The body 10 has a head shaped a goose one and its lower portion shaped a crescent, and is composed of a handle 11, an annular projecting edge 12, a blade base surface 20 and a press portion 24.

The handle 11 is formed as the lower portion of the body 10, having a proper width for holding. The handle 11 is provided with a small recess 111 at an upper front edge for a user's index finger to hold thereon and a large recess 112 at a lower front edge for a user's middle, fourth and little fingers to hold thereon, with a tapered projection 113 formed between the two recesses 111 and 112 for supporting the index finger. The handle 11 further has a hang hole 114 to be hung on a wall and taken down for use conveniently.

The projecting edge 12 is provided around the circumferential edge of the handle 111 for reinforcing the body 10.

The blade-base surface 20 is provided on the head of the body 10, lower than the surface of the handle 11. The blade base surface 20 is provided with a cutting groove 21, a first blade groove 22 for a blade for cutting, a second blade groove 221 for another blade for replacing the blade for cutting, and a plurality of combining members 23.

The cutting groove 21 is bored at a right side of the periphery of the blade base surface 20, formed to extend from inside to outside, inclined downward in a predetermined angle and extending to a side edge of the blade base surface 20 to make up a through opening. The cutting groove 21 has a preset width only large enough for a vehicle safety belt, a nylon band, a packaging strap or the like to be put therein and pass therethrough.

The first blade groove 22 is rectangular and is located at the right side of the blade base surface 20, while the second blade groove 221 is located parallel to and beside the first blade groove 22. The first blade groove 22 and the second blade groove 221 respectively have two position projections 222 provided vertically in alignment on a central portion for receiving a blade 30.

Two combining members 23 for combining the body 10 with the cover plate 40 together are shaped a semi-column to be respectively engaged in the combining holes 41 of the cover plate 40. Each combining hole 41 has a relatively large diameter in the inner side for enabling the combining members 23 to be easily engaged therein. Besides, each combining member 23 is provided with a hold ring 231 on the upper end to be inserted out of the combining hole 41 of the cover plate 40 and stuck on its outer edge.

The press portion 24 is convex in an arc shape and is located at the back edge of an upper section of the body 10 for a user to compress it thereon with his thumb conveniently.

The blade 30 is formed with a blade edge 31 on its lengthwise edge and two slots 32 aligned to each other on the center for respectively receiving the two position projections 222 of the first blade groove 22 or the second blade groove 221.

The cover plate 40 has the same shape as the blade base surface 20, positioned at a corresponding side of the blade base surface 20. The cover plate 40 is provided with the two combining holes 41 for respectively receiving the hold rings 231 of the two combining members 23 and a rectangular prying opening 42 for a flat screwdriver to be inserted therein and pry open the cover plate 20 for renewal of the blade 30.

In assembling, simply place the blade 30 in the blade fitting groove 22, letting the blade edge 31 face the cutting groove 21 and having its two slots 32 respectively fitted in the two position projections 222 of the blade fitting groove 22. Then, the combining holes 41 of the cover plate 40 are respectively engaged with the combining members 23 of the body 10 to finish assembling.

To renew the blade 30, a flat screwdriver is applied to insert into the rectangular prying opening 42 at the edge of the cover plate 40 and pry open the cover plate 40 to carry out renewing the blade 30 in the first blade groove 22.

As can be noted from the above description, this invention has the following advantages.

1. The blade base surface 20 is formed integral with the head of the body 10, but it is a relatively lower than the surface of the handle 11 for receiving the cover plate 40 thereon. The cover plate 40 has a comparatively small area and therefore is easy to be pried open for renewal of the blade 30, facilitating renewing and assembling a blade, and getting rid of the defect of the conventional cutter that it is necessary to disassemble the whole body for renewal of a blade.
2. Aside from the first blade groove 22 crossing with the cutting groove 21 for receiving the blade 30, the second blade groove 221 is additionally provided for receiving another blade 30 on standby, so that a user can at once renew the blade 30 in an emergency.
3. The handle 11 has its front edge formed with an upper recess 111 and a lower recess 112, the former provided for a user's index finger to hold thereon and the latter for the middle and the fourth fingers to grasp thereon, and between the two recesses 111 and 112 is formed the tapered projection 113 for enabling a user to hold the handle 11 stably.
4. The handle 11 is formed with an upper curved convex edge 24 for a user to press thereon with his thumb and a lower curved convex edge for a user to hold thereon with his palm, permitting a user to grasp the handle 11 stably and apply force conveniently.
5. The handle 11 has a reinforcing projecting edge provided around its circumference to let a user hold the handle 11 with great stability.

While the preferred embodiment of the invention has been described above, it will be recognized and understood that various modifications may be made therein and the appended claims are intended to cover all such modifications that may fall within the spirit and scope of the invention.

I claim:

1. A cutter for vehicle safety belts comprising a body, a cover plate and two blades;

said body having a head formed in an upper portion and a handle formed in a lower portion, said head formed with a blade base surface comparatively lower than the surface of said handle, said blade base surface formed with a first blade groove, formed in said blade base surface a first blade groove crossing with said cutting groove for a blade to be fitted therein to carry out cutting operation, a second blade groove provided parallel to and beside said first blade groove for receiving another blade on standby, said cover plate having the same shape as said blade base surface and two vertical combining holes spaced apart, said cover plate assembled on said blade base surface and covering it up: and;

said handle formed with a small recess at an upper front edge and a large recess at a lower front edge, between two said recesses formed a tapered projection, said handle further provided with a reinforcing projecting edge around its circumference for reinforcing said body and said handle.

2. The cutter for vehicle safety belts as claimed in claim 1, wherein said body has two semi-column combining members formed vertically in alignment on a central portion of said head and respectively engaged in said combining holes of said cover plate, each combining hole having a comparatively large diameter in the inner side thereof for each said combining member easily fitted therein, each said combining member having a hold ring formed in an upper end and thereof inserted out of said combining hole of said cover plate and stuck on its outer edge.

* * * * *